United States Patent [19]
McAdams

[11] Patent Number: 5,515,195
[45] Date of Patent: May 7, 1996

[54] OPTICAL BUS USING CONTROLLABLE OPTICAL DEVICES

[75] Inventor: Larry R. McAdams, Belmont, Calif.

[73] Assignee: Optivision Incorporated, Palo Alto, Calif.

[21] Appl. No.: 83,830

[22] Filed: Jun. 25, 1993

[51] Int. Cl.$^6$ ..................................................... H04J 14/02
[52] U.S. Cl. ........................ 359/173; 359/127; 359/113; 385/24; 385/42
[58] Field of Search ................................. 359/152, 113, 359/114, 173, 127, 164, 120, 121; 385/24, 40, 41, 42

[56] References Cited

U.S. PATENT DOCUMENTS

| | | | |
|---|---|---|---|
| 4,633,202 | 12/1986 | Basile et al. | 359/152 |
| 4,674,827 | 6/1987 | Izutsu et al. | 385/40 |
| 4,910,727 | 3/1990 | Fussganger | 359/114 |
| 5,018,815 | 5/1991 | Cox et al. | 385/41 |
| 5,148,503 | 9/1992 | Skeie | 385/16 |
| 5,295,011 | 3/1994 | Heise | 359/114 |
| 5,329,601 | 7/1994 | Nakamura | 385/40 |
| 5,347,601 | 9/1994 | Ade et al. | 359/152 |
| 5,359,449 | 10/1994 | Nishimoto et al. | 359/181 |

OTHER PUBLICATIONS

Takato et al, Silica–Based Single Mode Waveguides Silicon and Their Application to Guided–Wave Optical Interferometers, Jun. 1988, all.

Mark J. Karol, "Exploiting the Attenuation of Fiber–Optic Passive Taps to Create Large High–Capacity LAN's and MAN's," Journal of Lightwave Technology, vol. 9, No. 3, Mar. 1991, pp. 400–408.

Carl A. Villarruel et al., "Single–Mode Data Buses for Local Area Network Applications," Journal of Lightwave Technology, vol. LT–3, No. 3, Jun. 1985, pp. 472–477.

Michael B. Miller, "Linear Fiber Optic Data Bus for Aircraft Applications," SPIE, vol., 840, Fiber Optic Systems for Mobile Platforms (1987), pp. 128–135.

William G. Briscoe, "Fiber Optic Data Bus Networks," IEEE Proceedings—1989 Southeastcon, pp. 1140–1144.

M. Mehdi Nassehi et al., "Fiber Optic Configurations for Local Area Networks," IEEE Journal on Selected Areas in Communications, vol. SAC–3, No. 6, Nov. 1985, pp. 941–949.

F. Auracher et al., "Optimized Layout for a Data Bus System Based on a New Planar Access Coupler," Applied Optics, vol. 16, No. 12, Dec. 1977.

Nicholas F. Maxemchuk, "Twelve Random Access Strategies for Fiber Optic Networks," IEEE Transactions on Communications, vol. 36, No. 8, Aug. 1988, pp. 942–950.

Kazuyoshi Oshima, "Fiber–Optic Local Area Passive Network Using Burst TDMA Scheme," Journal of Lightwave Technology, vol. LT–3, No. 3, Jun. 1985, pp. 502–509.

Shigeo Matsushita, "Fiber Optic Devices for Local Area Network Application," Journal of Lightwave Technology, vol., LT–3, No. 3, Jun. 1985, pp. 544–555.

S. Y. Suh et al., "Fiber Optic Local Area Network Topology," IEEE Communications Magazine, Aug. 1986, vol. 24, No. 8, pp. 26–32.

Primary Examiner—Leo Boudreau
Assistant Examiner—Rafael Barares
Attorney, Agent, or Firm—Townsend and Townsend and Crew

[57] ABSTRACT

A bidirectional optical bus and bus interface. Each functional unit (35, 37) includes an active coupler (60, 70) for each bus line (40a, 40b) with which it is to interface. Each coupler is a four-port device, controllable to assume a desired one of at least two states characterized by different coupling coefficients. In the first state, a significant fraction (possibly all) of the light incoming to the first port (65a) is coupled to the fourth port (65d) and a significant fraction of the light incoming to the second port (65b) is coupled to the third port (65c). In the second state, most of the light incoming to the first port is coupled to the second port with a small fraction coupled to the fourth port, and most of the light incoming to the second port is coupled to the first port with a small fraction coupled to the third port. The couplers for a given bus line are serially connected with their respective first and second ports in line with the optical bus medium, and light is injected into the optical medium from both ends. A functional unit places data onto the bus by controlling its coupler according to a desired data pattern to switch between the first state and another state of significantly lower coupling coefficient.

33 Claims, 6 Drawing Sheets

OPTICAL BUS USING CONTROLLABLE OPTICAL DEVICES

This invention was made with Government support under contract DAAH02-92-C-R233 awarded by the U.S. Army Missile Command. The Government has certain rights in this invention.

BACKGROUND OF THE INVENTION

The present invention relates generally to optical communications devices, and more specifically to a computer bus based on such devices.

The speed and complexity of electronic systems is constantly increasing, brought about in large part by the increasing speed and complexity of available processors. Associated with this processing power, a functional unit based on one of these new processors may accept large amounts of input data and provide large amounts of output data. In addition to advances in processors, architectures have been migrating to distributed computing environments, with many functional units connected to a bus. The high-speed data input and output associated with such processors require that the bus have a very high throughput. Conventional electronic bus implementations use large numbers (typically 32 or 64) of parallel electrical lines for the physical interconnection medium (the "backplane"). At high clock speeds (>25 MHz), such buses exhibit serious problems associated with crosstalk and losses.

Advances in processors have been augmented by the development of advanced packaging techniques based on multichip modules (MCMs), where multiple chips are mounted to a common substrate and incorporated into a single package. Due to the large total chip area which can be contained in an MCM, it can have very substantial processing power. Thus, where functional units on a bus are based on MCMs, the demands on bus throughput can be even greater.

Optical buses can potentially overcome the limitations of electronic buses since optical interconnections can achieve virtually unlimited bandwidth (>>10 Gb/sec) over large distances (>>1 km). A number of optical buses have been proposed. These buses typically require that light be launched into the bus and tapped out of the bus where each functional unit (node) is attached to the bus. The bus taps are typically devices known as passive directional couplers.

By way of brief background, a directional coupler is a four-port device having a region (referred to as the interaction region) where two single-mode optical waveguides are brought close together. An optical signal in one waveguide can be coupled to the other waveguide through evanescent field coupling. This is based on the fact that there is a portion of the optical field outside of the waveguide (the "evanescent" field) which decays exponentially away from the edge of the waveguide. If another waveguide is brought sufficiently close to the first one, it will intersect some of the evanescent field and light can be coupled from the first waveguide to the second (and vice versa). This coupling phenomenon is analogous to quantum mechanical tunneling. The degree of coupling depends on the proximity of the waveguides, the length over which the waveguides are in proximity, and the indices of refraction of the materials.

By way of additional background, a fiber optic Mach-Zehnder interferometer is a four-port device comprising a first 3 db directional coupler (a 50% splitter) between the first and second ports on one side and first and second legs on the other side, and a second 3 db directional coupler between the first and second legs and the third and fourth ports. Light incoming to the first port is split equally between the first and second legs; the relative amounts of light exiting the third and fourth ports depend on the optical path difference between the two legs. By varying this optical path difference, the light can be selectively switched or split as desired.

For a directional coupler to be used as a bus tap, the geometrical and optical parameters would typically be chosen to provide a small degree of coupling into the node, with most of the light continuing to propagate down the bus. Buses based on directional couplers tend to be unidirectional in nature. Since bidirectionality is normally required in typical computer applications, the use of an optical bus might well militate toward a folded configuration or a ring topology, which may be undesirable. Additionally, since conventional tapped optical buses require a laser at each node for each bus line, high reliability may be difficult to achieve since lasers tend to be among the least reliable components in the bus. This problem can be mitigated by using a serial communication protocol on a single bus line, but that typically adds electronics overhead, and may be undesirable for other reasons.

Conventional tapped optical buses tend to have a number of additional problems. For example, a bus with N nodes attached may experience an optical loss between the transmitting laser and the receiver which scales as $1/N^2$. Furthermore, in such buses, the received signal power level is dependent on which node is transmitting data onto the bus. This results in the need to adjust the automatic gain control (AGC) at each receiver, which is time consuming and slows the bus down.

Therefore, while the concept of an optical bus shows great promise, the great success of fiber optic technology in the field of long-distance communications has not been paralleled or even approached in the more localized realm of computer systems.

SUMMARY OF THE INVENTION

The present invention provides a bidirectional optical bus and bus interface that avoid the need for a separate optical source at each functional unit. The invention may be used with a single bus line, or with a plurality of bus lines in parallel. The invention will be summarized in terms of a number of functional units connected to a single bus line, implemented as an optical waveguide. The invention may be used as a backplane bus or as a bus in a local area network (LAN).

In short, each functional unit includes an active (i.e., controllable) device, normally referred to as the coupler, for each bus line with which it is to interface. For a bidirectional bus, the couplers are four-port devices. If a bidirectional bus is not required, the couplers can be three-port devices.

In bidirectional embodiments where four-port couplers are used, each coupler is controllable to assume a desired one of at least two states characterized by different coupling coefficients. In the first state, a significant fraction (possibly all) of the light incoming to the first port is prevented from reaching the second port (typically being coupled to the fourth port) and a significant fraction of the light incoming to the second port is prevented from reaching the first port (typically being coupled to the third port). In the second state, most of the light incoming to the first port is coupled to the second port with a small fraction coupled to the fourth port, and most of the light incoming to the second port is coupled to the first port with a small fraction coupled to the third port.

The couplers for a given bus line are serially connected with their respective first and second ports in line with the optical bus medium, and light is injected into the optical medium from both ends, normally at approximately equal fixed intensities. The third and fourth ports communicate with respective photodetectors. Thus when a given unit places its coupler in the first state, a significant fraction of the light is switched off the bus, whereupon the intensity of the light reaching the units in both directions is significantly decreased. When a given unit places its coupler in the second state, only a small fraction of the light is switched off the bus, and there is no significant decrease in the intensity of light reaching the other units.

A functional unit places data onto the bus by controlling its coupler according to a desired data pattern to switch between the first state and another state characterized by a significantly lower degree of coupling. The other state can be the second state mentioned above, or may be any state in which little or no light is switched off the bus. This switching modulates the light traveling in both directions on the bus according to the data pattern. A functional unit, when it is not placing data on the bus, controls its coupler to be in the second state. This allows the functional unit to detect the modulation pattern of light on the bus.

In one set of embodiments, the coupler is a directional coupler with at least portions of the interaction region constructed of electro-optic waveguide material, whose index of refraction change in response to an electric field. An electrode structure is provided so that an electric field can be applied to the electro-optic material and thus changes the refractive index (and hence the coupling between the waveguides). The functional unit causes selected voltages to be applied to the electrode structure and thus controls the state of the coupler. The coupler can be constructed to be in or near the second state with zero voltage, so that at most a small DC bias voltage would be necessary to maintain the coupler in the second state.

In another set of embodiments, the coupler is a Mach-Zehnder interferometer with at least a portion of one of the legs constructed of electro-optic material. An electrode structure is provided so that an electric field can be applied to this portion and thus change the relative delay in the two legs. The functional unit controls the voltage applied to the electrode structure, and thus controls the state of the coupler.

This optical architecture provides a number of benefits. Since light is injected into both ends of the bus, and each functional unit modulates the light traveling in both directions, the bus is truly bidirectional. Since the functional unit places data on the bus by modulating the light that was injected into both ends of the bus, there is no need for a separate light source for each functional unit. This is a significant advantage when the number of optical bus lines or the number of functional units is large. Additionally, all signals received by a given functional unit in a given direction have the same intensity, being only a function of where the functional unit is located along the bus, and independent of which functional unit is modulating the light traveling along the bus. Moreover, in the context of a LAN, the architecture has the advantage that it avoids daisy-chain connections.

As mentioned above, where a bidirectional bus is not required, a unidirectional bus can be constructed from three-port optical devices. These devices have a single input port and two output ports. To form a bus using them, the input port and one of the output ports would be connected serially, and the other output port would be connected to a photodetector. A unidirectional bus fabricated in this manner would operate similarly to the bidirectional bus, except that signals could only be received in one direction.

A further understanding of the nature and advantages of the present invention may be realized by reference to the remaining portions of the specification and the drawings.

DESCRIPTION OF SPECIFIC EMBODIMENTS

Prior Art Electrical Bus

Figure 1:
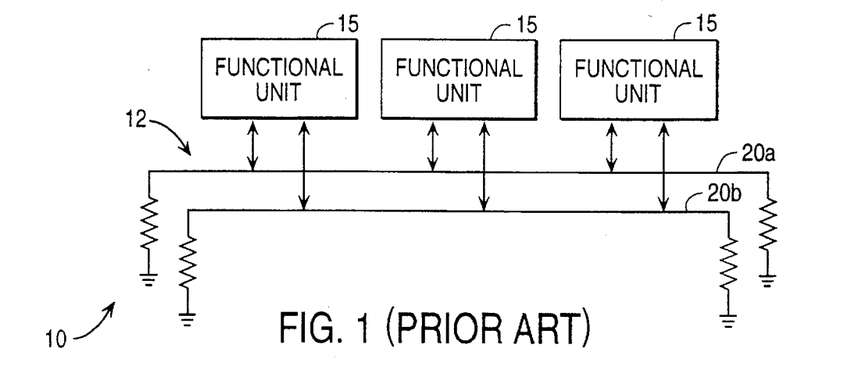
FIG. 1 is a high-level block diagram of a prior art bus having an electrical backplane.

FIG. 1 is a block diagram of a prior art computer system 10, illustrating a conventional bus system 12 to which a number of functional units 15 are connected. The bus system provides a structure including communication paths over which the functional units may communicate signals among one another. It is typically contemplated that a common set of signal lines ("party lines") will be used, with the various functional units being connected in parallel to the party lines. Only two of such lines, 20a and 20b, are shown, but typical modern buses include a large number (say 32 or 64) of lines.

The bus system may also include a number of "private" lines that provide communication paths between particular functional units. Although the term "bus" is sometimes used to refer to the signal lines themselves, or perhaps only the party lines, the term is often taken to include, in addition to the signal lines, the interface electronics associated with the functional units for transmitting and receiving signals according to a specified bus protocol. The bus system also typically comprises centralized or distributed logical unit for arbitrating requests from functional units for use of the bus.

The signal lines are sometimes implemented as generally parallel traces on a printed circuit board, known as a "backplane," with the circuit boards for the functional units plugging into connectors that hold the functional unit boards perpendicular to the plane of the backplane and perpendicular to the direction of the backplane circuit board traces. The signal lines define, along with a nearby power plane at a fixed DC level (for example, ground), respective transmission lines along which the bus signals propagate. Each connection to a line on the bus is shown as a single bidirectional signal line. A so-called "differential" bus dedicates a pair of lines to a given signal, with a voltage difference between the lines defining the signal polarity.

FIG. 1, if drawn with a single bus line, could also be considered to represent a local area network (LAN) where the functional units (often referred to as nodes) are typically at greater distances from each other than in the backplane bus context. Typical bus media for LANs include twisted pair and coaxial cable. Although the connection is a parallel one as shown, the actual implementation is often a daisy-chain arrangement where the physical cable connection is broken at each node.

Optical Bus Overview

The prior art is replete with examples of bus structures and protocols. The present invention provides an optical medium instead of circuit board traces for the bus party lines, and can be used to implement a wide variety of bus protocols. The invention may be implemented with a single bus line, or with a plurality of bus lines in parallel. If a single bus line is used, a functional unit places a plurality of data bits on the bus and reads a plurality of data bits from the bus in serial fashion. If a predetermined plurality of bus lines in parallel are used, a functional unit places a corresponding plurality of bits on the bus in parallel and reads a corresponding plurality of bits from the bus in parallel.

The description that follows is in terms of a bidirectional bus using four-port couplers. Occasional parenthetical remarks will be made where a unidirectional bus can be constructed from three-port optical devices.

Figure 2:
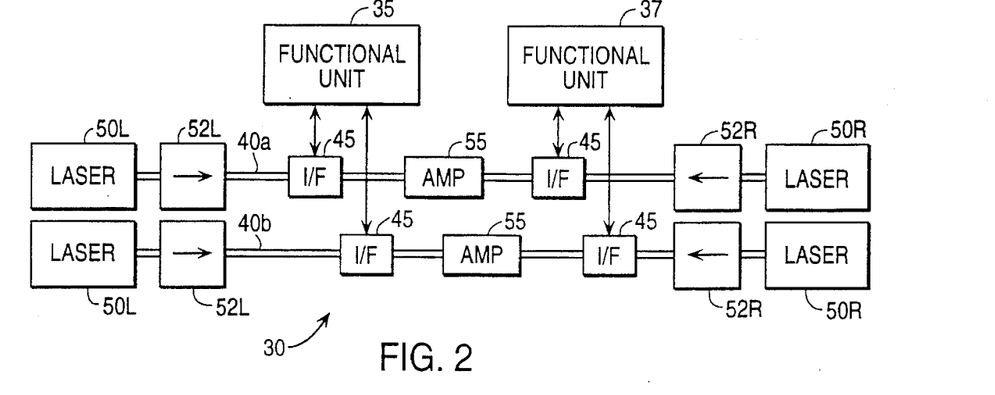
FIG. 2 is a high-level block diagram of an optical bus according to the present invention.

FIG. 2 is a block diagram of a computer system 30 in which a plurality of functional units, two of which (35 and 37) are shown, communicate signals to one another over a number of optical bus lines. For purposes of illustration, two optical bus lines 40a and 40b are shown. In a LAN environment, there would be only one bus line. Although the bus is bidirectional, it will be considered to have left and right ends for ease of reference. A given function unit is coupled to each bus line through a bus interface module 45 that includes optical and electrical components, as will be described below. The connection between a given functional unit and one of its interface modules is shown as a single bidirectional signal line.

Unlike many prior art optical bus arrangements where each functional unit has its own laser source to drive light onto the bus medium, the present invention operates by having light injected into both ends of the bus (only one end for a unidirectional bus) and having a functional unit place data on the bus by modulating the light on the bus. Optical power for a given bus line is supplied by continuous wave (CW) lasers 50L and 50R (only one laser for a unidirectional bus) located at the left and right ends of the bus. The two lasers for each line provide counter-propagating light throughout the length of the bus line, and operate at roughly the same wavelength. Although semiconductor lasers are likely to be the devices of choice in many applications, other types of lasers might be preferred in special circumstances. Optical isolators 52L and 52R are shown adjacent the lasers for those cases where they are needed to prevent the light from one laser from perturbing the other and thus creating either intensity or spectral noise.

An amplifier 55 is shown between the bus interface modules on each line. The amplifiers compensate for the optical insertion loss of the bus interface modules. The number and position of these amplifiers is a function of the optical insertion loss of the bus interface module, the number of modules on the bus, and the gain of the amplifiers. The amplifier(s) (if needed) can be of any known construction, for example an erbium-doped waveguide or a semiconductor laser amplifier.

Switched Coupler

Each bus interface module includes an optical element that is capable of (a) modulating the light traveling along the bus in order to send data, and (b) tapping a small fraction of light off the bus for receiving data. The preferred devices for performing this function are four-port devices, referred to as couplers. In different embodiments, a coupler for use with the present invention may be implemented as a directional coupler or as a Mach-Zehnder interferometer. Three-port devices can be used for a unidirectional bus.

The description below will first be in terms of the directional coupler, followed by a description of the Mach-Zehnder interferometer. While the internal structure and operation of the two types of device are different, each can be viewed at a high level as a four-port device (A, B, C, and D ports), controllable to assume a bar state, a cross state, or selected states in between. In the bar state, light is coupled between the A and B ports with substantially no crosstalk into the C and D ports. In the cross state, substantially all the light incoming to the A port is coupled to the D port without crosstalk to the B port and substantially all the light incoming to the B port is coupled to the C port without crosstalk to the A port. The couplers for a given bus line are serially connected with their A and B ports in line with the bus medium. The C and D ports for a given coupler are terminated at respective photodiodes.

Figure 3A:
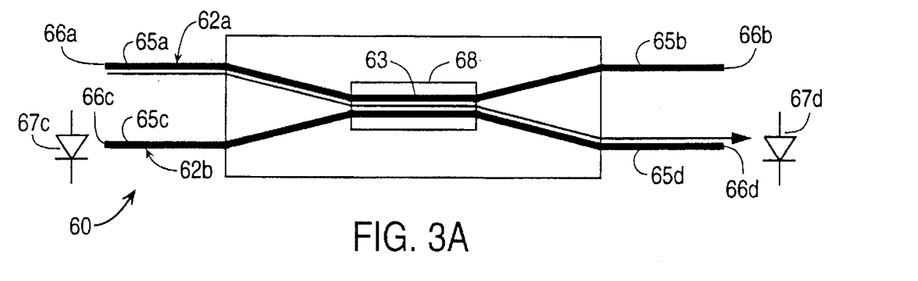
FIGS. 3A and 3B are schematic views showing the operation of a switched directional coupler as used with the present invention.
Figure 3B:
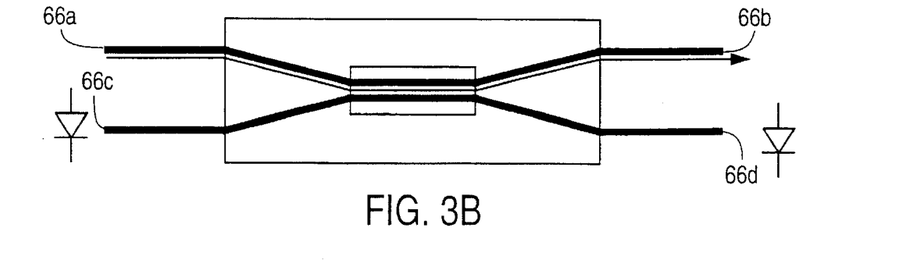

FIGS. 3A and 3B are highly schematic views showing the cross and bar states of a switched directional coupler 60, which is one type of optical device that can be used in the bus interface module to sense the modulation of the light on the bus (for receiving) and to modulate the light on the bus (for transmitting). Directional coupler 60 comprises first and second waveguides 62a and 62b, shown generally in the plane of the drawing, which are brought close together over an interaction region 63 so that light traveling in one of the waveguides may be coupled into the other through evanescent field coupling. Regions 65a, 65b, 65c, and 65d of the waveguides away from the interaction region can be considered to constitute the A, B, C, and D ports, respectively. The A, B, C, and D ports of the directional coupler are designated 66a, 66b, 66c, and 66d, respectively. The C and D ports are terminated at respective photodiodes 67c and 67d.

Control of the coupling is accomplished as follows. As mentioned above, the degree of coupling depends on the proximity of the waveguides, the length over which the waveguides are in proximity, and the indices of refraction of the materials. In the present case, the directional coupler, or at least a portion of its interaction region, is made of an electro-optic material, that is, a material whose index of refraction changes in response to an applied electric field. A pair of opposed electrodes are disposed relative to the interaction region so that an electric field can be applied to the waveguide material by applying a voltage across the electrodes. One of the electrodes, designated 68 and shown in outline, lies in a plane parallel to that of the drawing, and overlies the interaction region. The other electrode lies in a plane parallel to that of electrode 68, but underneath the interaction region.

Materials exhibiting the linear electro-optic effect are anisotropic, with the material exhibiting different optical properties for different directions of optical propagation and polarization relative to the lattice of the material. These different optical properties include differences in the index of refraction and in the strength of the electro-optic effect (defined as the amount of change in the index of refraction for a given applied electric field).

Figure 4A:
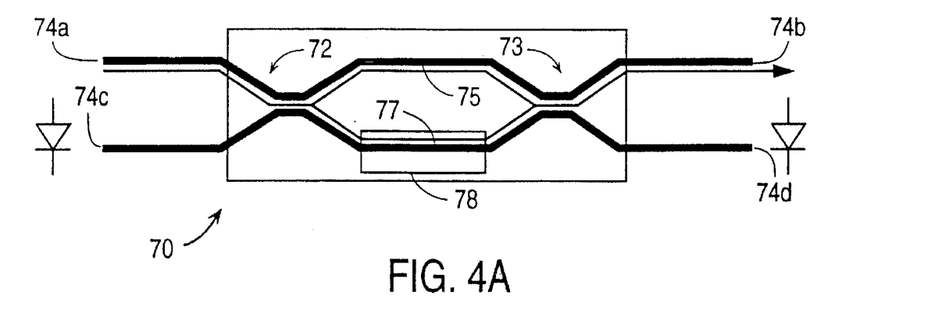
FIGS. 4A and 4B are schematic views showing the operation of a switched Mach-Zehnder interferometer as used with the present invention.
Figure 4B:
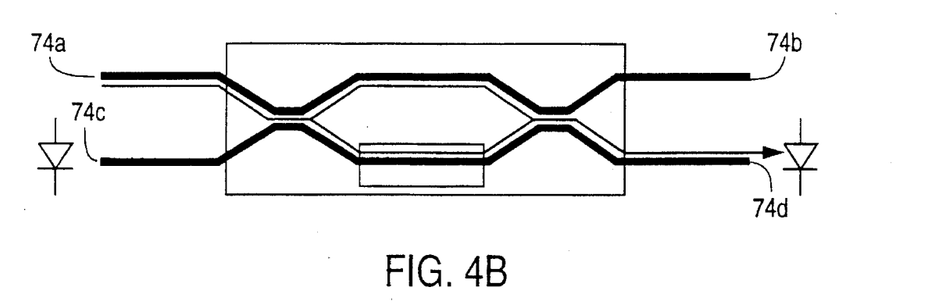

FIGS. 4A and 4B are highly schematic views showing the cross and bar states of a Mach-Zehnder interferometer 70, which is another type of four-port optical device that can be used as the coupler in the bus interface module. As in the case of FIGS. 3A and 3B, the waveguides lie generally in the plane of the drawing. The interferometer comprises back-to-back 3 db directional couplers 72 and 73, that is, couplers that operate to split incoming light at the A port equally between the B and D ports. The A and C ports of directional coupler 72 define the A and C ports of the overall device while the B and D ports of directional coupler 73 define the B and D ports of the overall device. The A, B, C, and D ports of the overall device are designated 74a, 74b, 74c, and 74d, respectively.

The B port of directional coupler 72 is connected to the A port of directional coupler 73 to define a first leg 75 of the interferometer. The D port of directional coupler 72 is connected to the C port of directional coupler 73 to define a second leg 77 of the interferometer. The two legs of the interferometer are configured to be of nearly equal optical path length, and at least a portion of one of the legs, say the second leg, is constructed of electro-optic material. Electrodes (one of which, designated 78, is shown in outline) are disposed so as to allow an electric field to be applied to the electro-optic material and thus change the relative delay between the two legs.

Figure 5:
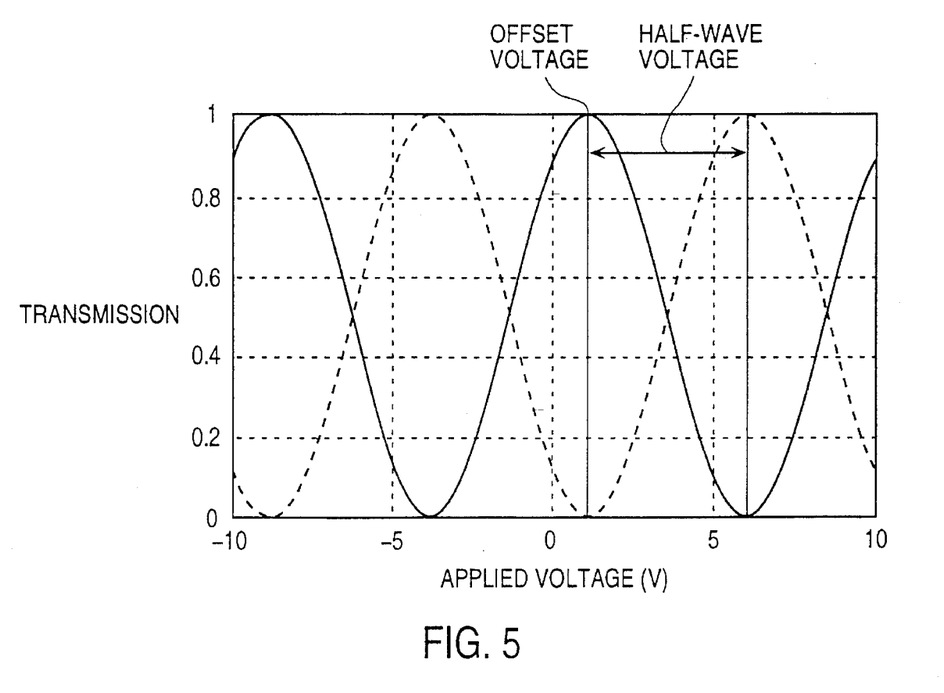
FIG. 5 is a plot of transmission as a function of applied voltage for a switched coupler as used with the present invention.

FIG. 5 shows the transmission (coupling between A and B ports) of a directional coupler as a function of the applied voltage. The Mach-Zehnder interferometer would show similar behavior. From conservation of energy, the transmission of the two output arms must sum to unity for any given applied voltage. For the particular directional coupler shown, the straight-through path achieves maximum transmission at 1 volt. This voltage is referred to as the offset voltage. The offset voltage is typically not a well-controlled device parameter, being very sensitive to various fabrication parameters as well as temperature. The voltage difference between the maximum and minimum transmission of either path is known as the half-wave voltage, and is 5 volts for the example shown. To minimize the power required to modulate the directional coupler, it is desirable to minimize the half-wave voltage.

Reduced to essentials, the coupler must be able to assume either of at least two states, one in which it blocks a significant fraction (say 50–100%) of the light traveling along the bus, and one in which it diverts a small non-zero fraction (say 1–10%) of the light off the bus. The second state is needed for the functional unit to listen on the bus and determine the light level on the bus. The first is needed for the functional unit to be able to change the amount of light on the bus by a recognizable amount to define two data values (for digital data—additional intermediate states would be required for analog modulation). There is no fundamental reason that data transmission cannot use the cross and bar states, which provide the most distinct pair of light levels, but the bar state is, by definition, not suitable for receiving data. Furthermore, while the devices described above block the light traveling along the bus by diverting it to one of third or fourth ports, the light that is blocked is not needed, and could, in principle, be dissipated or otherwise prevented from passing.

There is no single optimum value for the fraction that characterizes the second state. What is needed is that all the functional units can detect the level of light on the bus with an acceptable signal-to-noise ratio. A fraction that is too large may limit the number of functional units or require an unacceptably large number of amplifiers, while a value that is too small will merely ensure that none of the functional units have acceptable signal-to-noise ratio.

Alternative Partitioning Embodiments

Figure 6A:
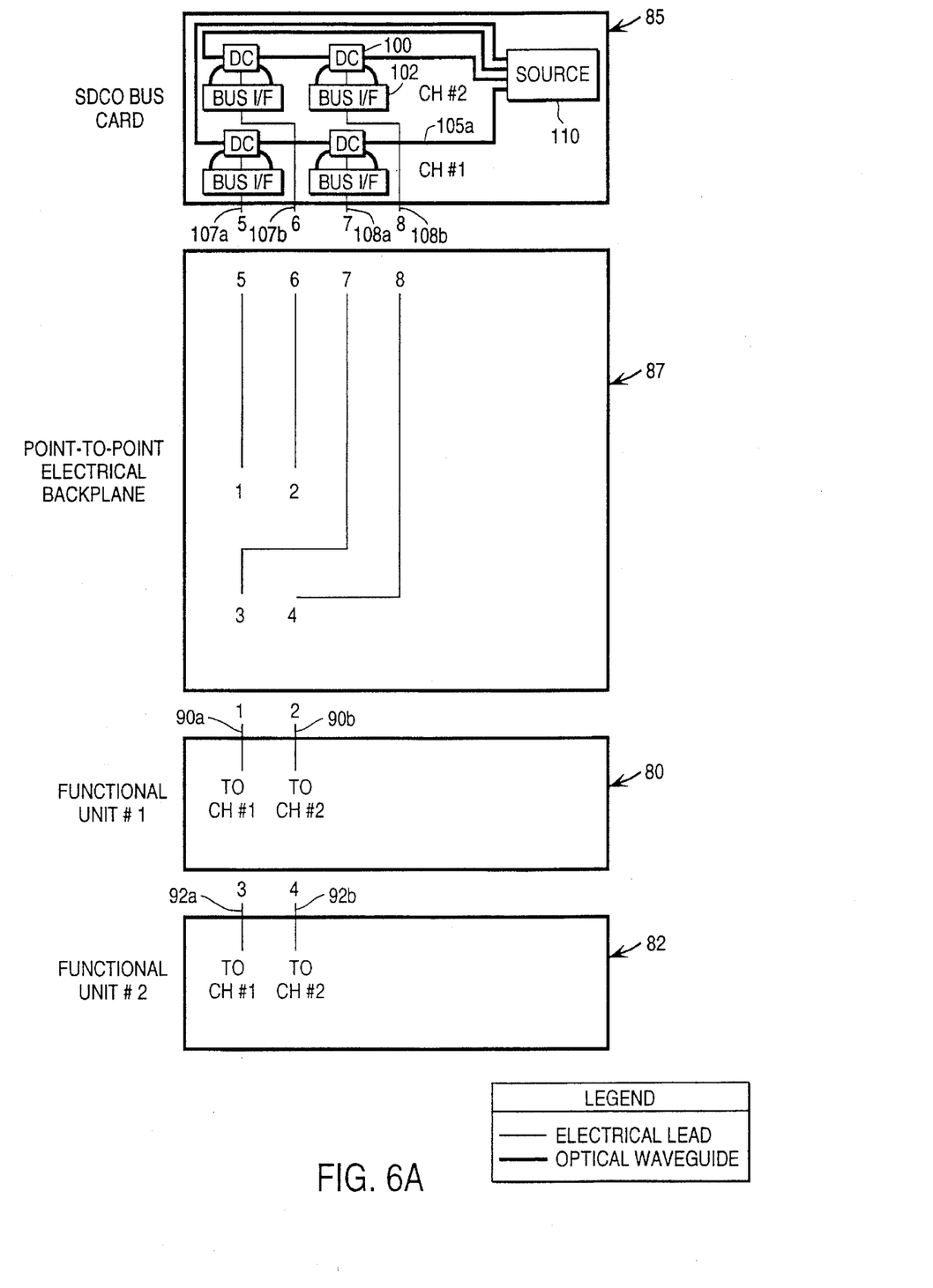
FIGS. 6A–6C are schematic views of embodiments of the optical bus according to the present invention.
Figure 6B:
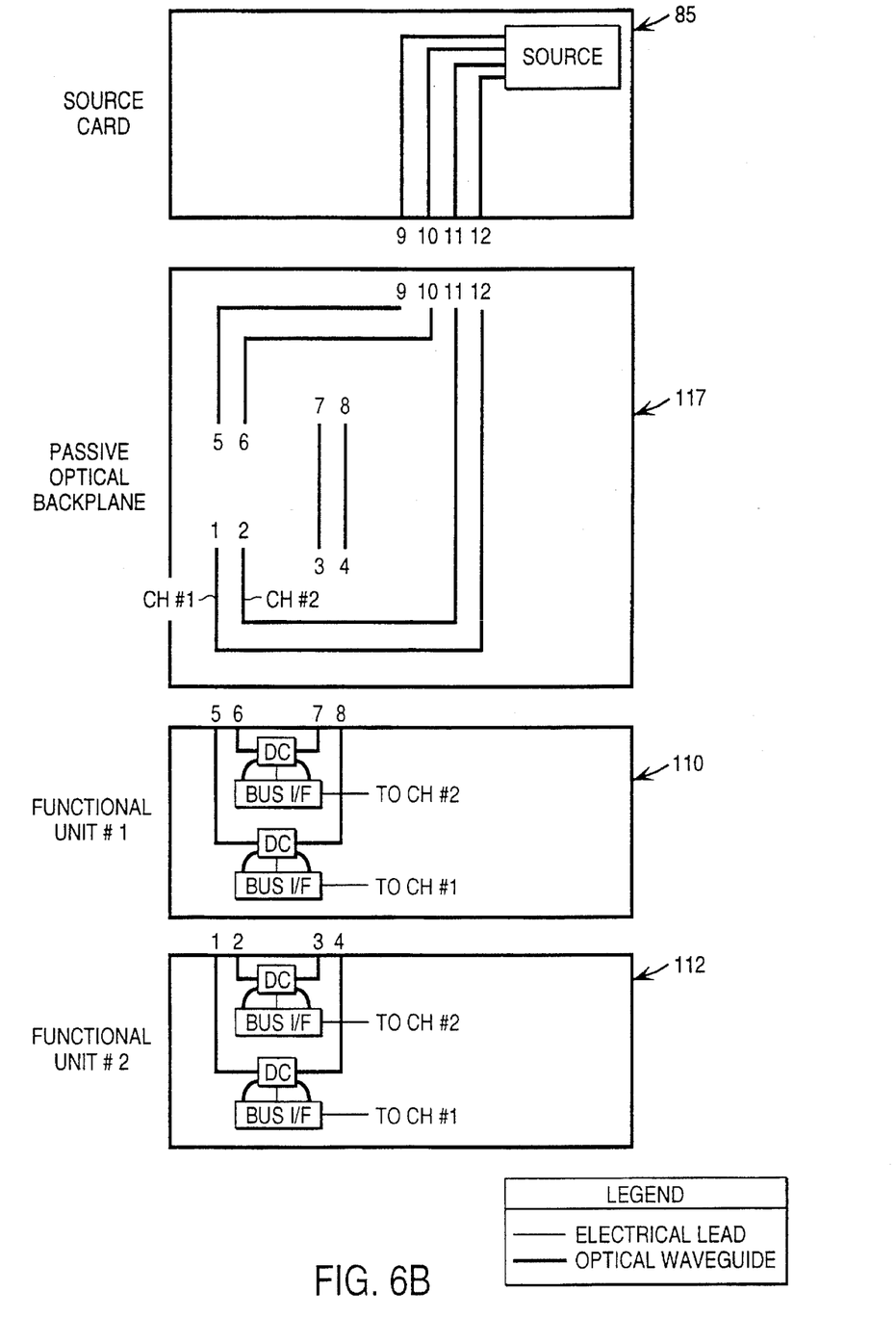
Figure 6C:
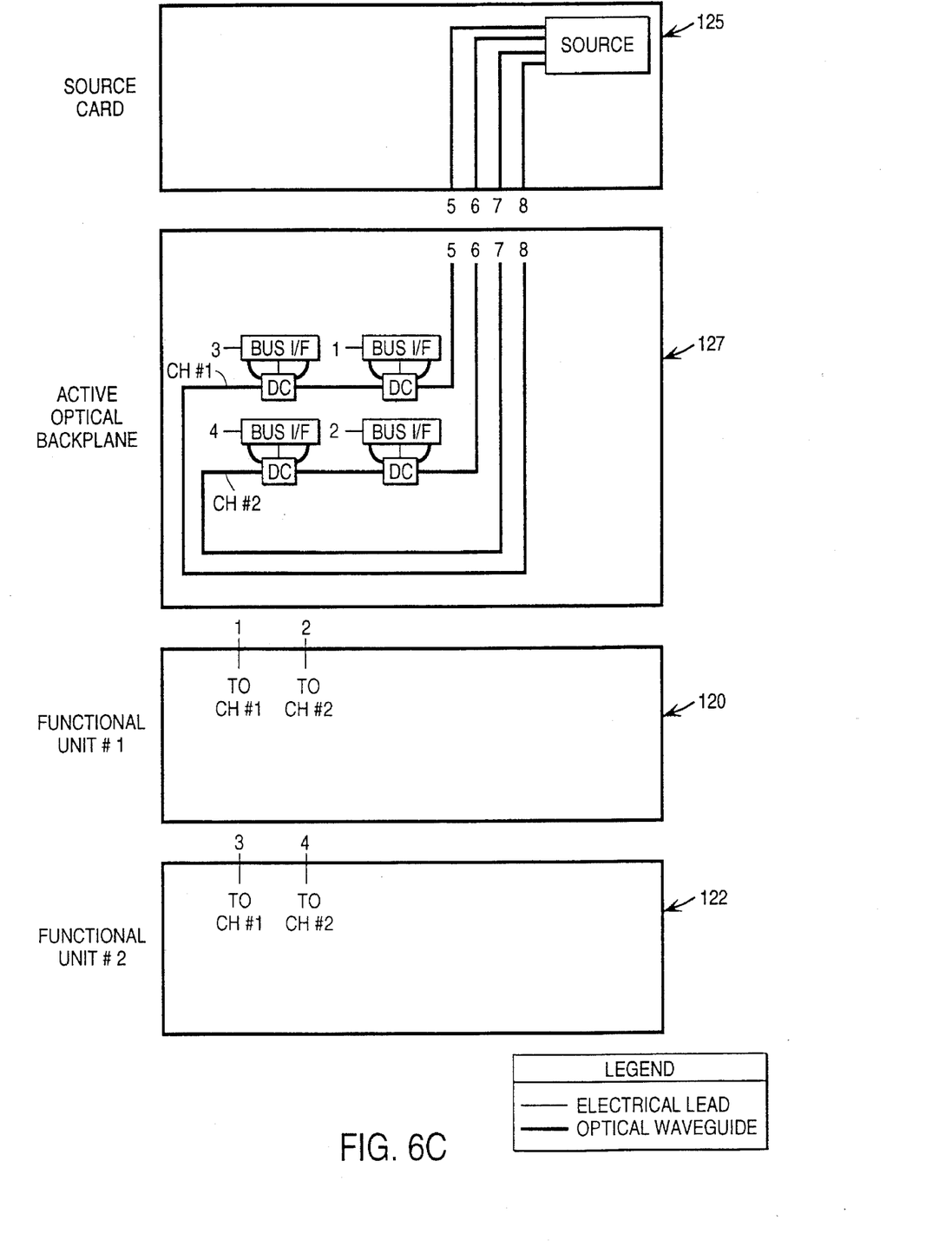

FIGS. 6A–6C are schematic views showing different arrangements for implementing, in modular form, the optical and electronic interconnections of system 30 of FIG. 2.

FIG. 6A shows a configuration where the functional units are implemented on circuit boards 80 and 82, the optical bus is implemented as an optical bus card 85, and the connections of circuit boards 80 and 82 to optical bus card 85 are implemented as traces on an electrical backplane 87. This arrangement is in some sense the most traditional from an implementation point of view since it contemplates circuit boards connected to a circuit board backplane with conventional edge connectors.

Each of circuit boards 80 and 82 contains only the circuitry that defines the functional unit and the circuitry that supports the bus protocol. In the illustrative embodiment, the functional unit provides output signals and receives input signals on a single bidirectional signal line. As such, circuit boards 80 and 82 correspond to functional unit blocks 35 and 37 in FIG. 2. Circuit board 80 has a pair of terminals 90a and 90b for ultimate connection to a pair of optical bus lines corresponding to optical bus lines 40a and 40b in FIG. 2. Circuit board 82 has a similar pair of terminals 92a and 92b.

Optical bus card 85 includes all the optical elements needed to implement the optical bus, and the optical and electronic elements needed to implement the bus interface modules (blocks 45 in FIG. 2). Each bus interface module includes a switched directional coupler 100 and a bus interface circuit 102 that includes the electronic circuitry for detecting optical signals and driving the electrodes in the directional coupler. Two optical bus lines 105a and 105b are shown, with bus interface modules for each of the two functional units and each of the lines. The optical bus card has a pair of terminals 107a and 107b for the connections of the first functional unit, and a pair of terminals 108a and 108b for the connections of the second functional unit. The optical bus card also includes a laser module 110 that includes the lasers that are used to inject light into both ends of each bus line. Bus interface circuit 102 and laser module 110 will be described in detail below.

Backplane 87 is fabricated in a similar manner to conventional electrical backplanes, including socket connectors for accepting circuit boards 80 and 82, but differs in the nature of the bus lines. In particular, backplane 87 does not implement party lines, but rather implements point-to-point connections between the terminals on the functional unit circuit boards and the terminals on optical bus card 85.

FIG. 6B shows a configuration where the functional units and the optical bus interface modules are implemented on circuit boards 110 and 112, the laser module is mounted on a source card 115, and the optical bus connections between the interface modules and the source are implemented as waveguides on a passive optical backplane 117. This arrangement differs from the more traditional approach of the embodiment of FIG. 6A in that all the connections to the backplane are optical rather than electrical.

FIG. 6C shows a configuration where the functional units are implemented on circuit boards 120 and 122, the laser module is mounted on a source card 115, and the optical bus, including the bus interface modules, is implemented on an active optical backplane 127. This arrangement requires an optical connection between the source card and the backplane, but the circuit boards for the functional units are connected to the active optical backplane with conventional edge connectors. In one possible variant, the source could be mounted on the optical backplane board and there would be no need for a separate source card and optical connector.

Specific Implementations

Figure 7:
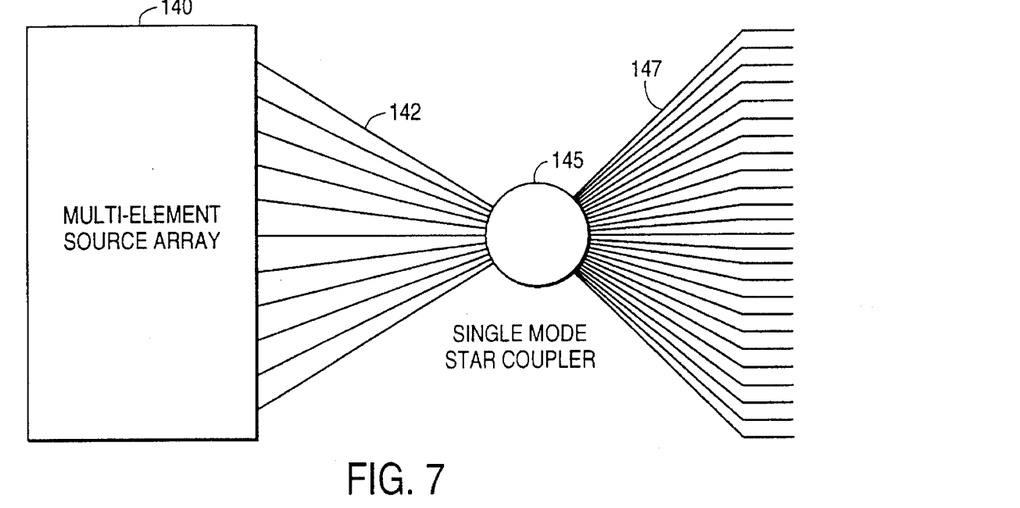
FIG. 7 is a schematic view of a laser source for use with the present invention.

FIG. 7 is an optical schematic of a laser source module suitable for driving a plurality of bus lines. At least some of the elements of a multi-element source array 140 are coupled to respective input ports 142 of a star coupler 145, the output ports 147 of which are coupled to respective waveguides that define the optical bus lines. The multi-element source array can be fabricated with vertical cavity surface emitting lasers.

For the case where there are M elements coupled to M input ports of an M×N star coupler, there are N separate sources capable of supporting N/2 bus lines. This configuration has built-in redundancy in that the failure of a relatively small number of elements in the source array would have negligible effect on the overall system (since the light injected into a given line on the bus is derived from a relatively large number of elements).

Figures 8, 9:
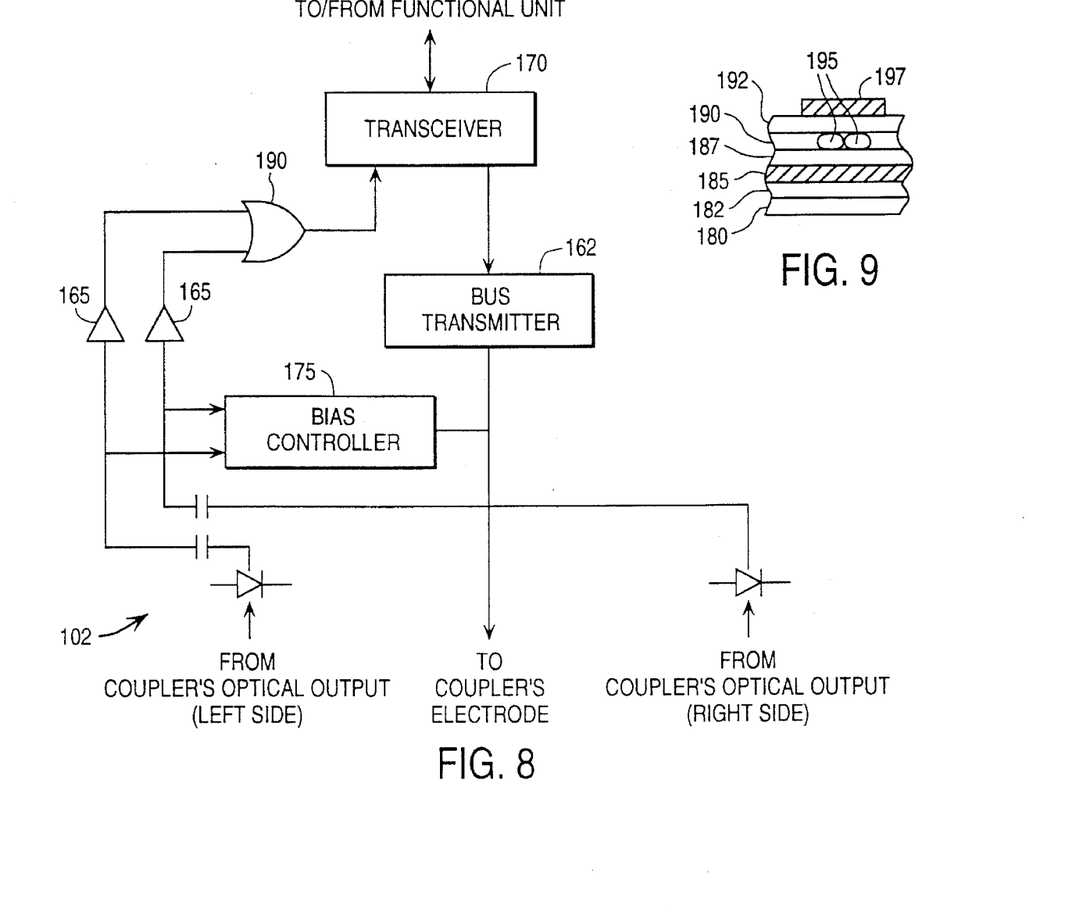
FIG. 8 is a block diagram of a bus interface circuit for use with the present invention.
FIG. 9 is a cross-sectional view of a switched directional coupler as used with the present invention.

FIG. 8 is a block diagram of the circuitry in one of the bus interface modules (referred to as circuit 102 in FIG. 6A). In brief, the circuit includes a transmitter 162, a pair of high-speed receivers 165, a transceiver 170, a bias controller 175, and a gate 180. In transmit mode, the circuit operates to apply an appropriate voltage to the coupler electrodes in accordance with the desired digital or analog data pattern and thus modulate the light on the bus. In receive mode, the circuit applies an appropriate DC bias (a voltage near the offset voltage) to the coupler electrodes to set the coupler to tap the appropriate amount of light from the bus, and generates a signal representative of this modulation.

During transmission, bias controller 175 sets the DC bias to the half-power transmission point on the directional coupler transmission characteristic, which occurs at a voltage $0.5\ V_p$ above or below the minimum transmission point, where $V_p$ is the half-wave voltage. Bus transmitter 162 provides high-speed modulation of the directional coupler output by generating signals around this half-power point.

During reception, the signals from the photodetectors are sent to the high-speed receivers. The drawing shows the receivers as being AC-coupled, so that their output signals represent the transitions due to modulation of the light on the bus by the transmitting functional unit. Each receiver is assumed to output a logical zero when no data is present for that receiver's direction. Thus the gate, shown as an OR gate, passes the modulated signal from the receiver that is actually receiving data.

As discussed above, the offset voltage varies from coupler to coupler and drifts as a function of temperature. Accordingly, the bias controller provides closed-loop control to set the appropriate tapping percentage. The bias controller sets the DC bias to a level which provides enough tapped power to achieve the desired signal-to-noise ratio (approximately 24 dB in the high-speed receiver). If there is a large optical signal on the bus, the tapping percentage can be set to a small value while still providing an acceptable received signal-to-noise ratio.

Although lithium niobate is a well-known and widely used electro-optic material, a number of factors militate toward a polymer material for the present invention. The relative merits of the two will now be discussed.

Lithium niobate is an inorganic crystal material that is typically grown in the form of boules. In order to be useful for the present invention, the lithium niobate boule must be cut into thin wafers with the correct orientation relative to the crystal lattice, and then polished to form an optically smooth surface on one side of the wafer. In order to form waveguides in the lithium niobate, titanium is typically diffused into the material from the top surface. The waveguide pattern is photolithographically defined. A variety of such devices are commercially available, including phase modulators, Mach-Zehnder amplitude modulators, and directional coupler switches and modulators.

Though integrated-optic lithium niobate devices have been worked on for more than 15 years, they are still quite expensive to produce. This is due to the difficulty in growing high optical quality boules, and the expense in obtaining an optical polish on one of the surfaces. Furthermore, lithium niobate is not naturally suited to be integrated with electronic devices, is fairly optically lossy, and requires reasonably high voltages.

In recognition of the shortcomings of lithium niobate, much work has been devoted to the development of electro-optic materials which are more manufacturable. Much of the work in this area has concentrated on the development of nonlinear organic molecules in a polymer host. Through molecular engineering, these organic molecules are designed to maximize the linear electro-optic effect.

The material, consisting of nonlinear organic molecules in the polymer host, is spun onto a flat substrate. Since the polymer is a glass, the organic molecules are randomly oriented in the polymer host and the material acts as an isotropic optical medium. However, the linear electro-optic effect requires an non-centrosymmetric material structure (which is intrinsically anisotropic). This is achieved by orienting the organic molecules in a single direction through poling. In poling, the material is heated to a temperature which is sufficient to allow the organic molecules to re-orient themselves. A strong electric field is then applied which, through the dipole moment of the organic molecules, forces the molecules to re-orient themselves so that their dipole moments are aligned with the applied field. The material is then cooled so that the organic molecules retain their orientation.

Waveguides can be formed in the material by selective etching to form ridge waveguides, or by selective poling or bleaching of the material to form buried waveguides. The major challenges in development of these new nonlinear materials have been depoling and high absorption losses. Over time, and particularly at elevated temperatures, the materials have tended to de-pole themselves, thus leading to a reduction or elimination of the electro-optic effect. This problem has largely been solved for temperatures below 100° C. A strong electro-optic effect is intrinsically related to higher material absorption. Much work has been devoted to minimizing this absorption, and current materials have demonstrated absorption in the 1 dB/cm range. Nonlinear polymer-based materials have been pursued at a number of companies including Lockheed Palo Alto Research Center, Hoescht Celanese, and Akzo. These companies typically use a silicon wafer as a substrate for the material.

Nonlinear polymer-based devices can be manufactured in a cost-effective manner and they can be integrated with electronics. The polymer/organic molecule material can be prepared inexpensively. It is then simply spun onto a substrate as a glass, and then poled, patterned by lithography, and etched to form the waveguides. All of these steps are relatively low cost and amenable to mass-production techniques. Multiple couplers may be cascaded on a single substrate. A silicon substrate is typically used as a substrate, and is quite well-suited to this application. Electronic devices can be fabricated on the silicon wafer prior to deposition of the organic polymer material, leading to an integrated optical/electronic system. It is possible to integrate most or all of the bus interface module circuitry on the same substrate as the waveguides. However, significant advantages are still realized if only the photodiodes are integrated due to the smaller number of fiber pigtails required.

FIG. 9 is a fragmentary cross-sectional view showing the structure of the interaction region of a polymer directional coupler. Typical materials and dimensions will be given, but should be understood to be representative. The devices are fabricated on a silicon substrate 180, on which a silicon dioxide bonding layer 182 and a bottom electrode 185 (1 μm aluminum) have been deposited using conventional semiconductor processing technology. A bottom cladding layer 187 (3–4 μm of a polymer material having a refractive index on the order of 1.55), a guiding layer 190 (2 μm of non-linear polymer material), and a top cladding layer 192 (3–4 μm) are formed over the bottom electrode. The waveguide pattern, designated 195 is formed in the guiding layer by a combination of poling and bleaching; the poling results in the material having significantly different refractive indices for TE (on the order of 1.60) and TM (on the order of 1.66). A top electrode 197 is formed over the relevant portion of the structure.

Conclusion

In conclusion it can be seen that the present invention provides an optical bus that addresses significant problems normally associated with optical buses, and thus makes the numerous advantages of an optical bus available in a practical and relatively simple system.

While the above is a complete description of a specific embodiment of the invention, various alternative constructions, modifications, and equivalents may be used. For example, instead of using electro-optic devices, such as the switched directional coupler and Mach-Zehnder interferometer described here, the optical bus can be fabricated with semiconductor-based optical switches. Two examples of this type of switch are the Y-branch (three-port) and X-crossing (four-port) switch designs fabricated using semiconductor materials, such as InP. These devices are based on the change in refractive index achieved through the injection of free carriers. Additionally, instead of using one laser which is divided and supplied to both ends of a bus line, it is possible to use two lasers, each operating at slightly different frequencies. Each laser would be provided with an optical filter to block light from the other laser. This can be cost effective, despite the cost of the extra laser, because filters are likely to be less expensive than isolators.

Therefore, the above description should not be taken as limiting the scope of the invention which is defined by the claims.

What is claimed is:

1. An optical device adapted to be interposed in an optical transmission medium, comprising:

an active coupler having first, second, third, and fourth ports and a control element, said control element being responsive to input signals and operable to place said coupler in either of at least first and second states;

said first state preventing a significant fraction of light from said first port from reaching said second port and preventing a significant fraction of light from said second port from reaching said first port;

said second state coupling a significant fraction of light from said first port to said second port, a small fraction of light from said first port to said fourth port, a significant fraction of light from second port to said first port, and a small fraction of light from said second port to said third port; and a photodetector in optical communication with said third port of said coupler.

2. The device of claim 1 wherein:

at least a portion of said coupler is constructed from an electro-optic material; and said control element includes at least one electrode configured to apply an electric field to at least a portion of said electro-optic material.

3. The device of claim 1 wherein:

said coupler is a directional coupler having an interaction region, at least a portion of which is constructed from an electro-optic material.

4. The device of claim 1 wherein:

said coupler is a Mach-Zehnder interferometer having first and second legs; and at least a portion of at least one of said legs is constructed from an electro-optic material.

5. The device of claim 1, and further comprising a transmitter unit having means for causing said control element to modulate light passing between said first and second ports according to a desired data pattern.

6. The device of claim 1, and further comprising:

a second photodetector in optical communication with said fourth port; and means for causing said control element to place said coupler in said second state.

7. An optical bus interface device adapted to be interposed in an optical transmission medium, comprising:

an active coupler having first, second, third, and fourth ports and a control element, said control element being responsive to input signals and operable to place said coupler in either of at least first and second states;

said first state preventing a significant fraction of light from said first port from reaching said second port and preventing a significant fraction of light from said second port from reaching said first port;

said second state coupling a significant fraction of light from said first port to said second port, a small fraction of light from said first port to said fourth port, a significant fraction of light from second port to said first port, and a small fraction of light from said second port to said third port;

a transmitter unit for applying control signals to said control element, for selectively placing said coupler in a desired state; and a receiver unit, responsive to light at said third and fourth ports of said coupler, for providing signals representative of the light at said third and fourth ports.

8. The device of claim 7 wherein:

at least a portion of said coupler is constructed from an electro-optic material; and said control element includes at least one electrode configured to apply an electric field to at least a portion of said electro-optic material.

9. The device of claim 7 wherein:

said coupler is a directional coupler having an interaction region, at least a portion of which is constructed from an electro-optic material.

10. The device of claim 7 wherein:

said coupler is a Mach-Zehnder interferometer having first and second legs; and at least a portion of at least one of said legs is constructed from an electro-optic material.

11. The device of claim 7 wherein:

said receiver unit includes means for causing said control element to place said coupler in said second state; and said transmitter unit includes means for causing said control element to modulate light passing between said first and second ports according to a desired data pattern.

12. The device of claim 7 wherein said receiver unit comprises:

first and second photodetectors in optical communication with said third and fourth ports, respectively; and means for causing said control element to place said coupler in said second state.

13. An optical bus for a computer system having a plurality of functional units, the bus having two ends designated the left end and the right end, comprising:

a plurality of active couplers, each having first, second, third, and fourth ports and a control element, said control element being responsive to input signals and operable to place said coupler in either of at least first and second states;

said first state preventing a significant fraction of light from said first port from reaching said second port and preventing a significant fraction of light from said second port from reaching said first port;

said second state coupling a significant fraction of light from said first port to said second port, a small fraction of light from said first port to said fourth port, a significant fraction of light from second port to said first port, and a small fraction of light from said second port to said third port; and means for optically connecting said couplers in a serial fashion to define a bus line with one of said couplers being the leftmost coupler and another of said couplers being the rightmost coupler, wherein each coupler has its first port in optical communication with the second port of the coupler to the left, if any, and its second port in optical communication with the first port of the coupler to the right, if any;

means for injecting light into the first port of the leftmost coupler and into the second port of the rightmost coupler;

a plurality of transmitter units, each for applying control signals to a different respective one of said control elements, for selectively placing the respective coupler in a desired state; and a plurality of receiver units, each responsive to light at said third and fourth ports of a different respective one of said couplers, for providing signals representative of the light at said third and fourth ports when the respective coupler is in said second state.

14. The optical bus of claim 13 wherein:

at least a portion of at least one of said couplers is constructed from an electro-optic material; and said control element for said at least one of said couplers includes at least one electrode configured to apply an electric field to at least a portion of said electro-optic material.

15. The optical bus of claim 13 wherein:

at least one of said couplers is a directional coupler having an interaction region, at least a portion of which is constructed from an electro-optic material.

16. The optical bus of claim 13 wherein:

at least one of said couplers is a Mach-Zehnder interferometer having first and second legs; and at least a portion of at least one of said legs is constructed from an electro-optic material.

17. The optical bus of claim 13 wherein:

at least one of said receiver units includes means for causing said control element to place said coupler in said second state; and at least one of said transmitter units includes means for causing said control element to modulate light passing between said first and second ports according to a desired data pattern.

18. The optical bus of claim 13 wherein at least one of said receiver units comprises:

first and second photodetectors in optical communication with said third and fourth ports, respectively; and means for causing said control element to place said coupler in said second state.

19. The optical bus of claim 13 wherein said means for injecting light comprises, for a bus with N lines in parallel:

a plurality of laser sources;

means for communicating said laser sources to respective inputs of a star coupler having at least 2N outputs;

means for communicating N of said outputs to the first ports of the leftmost couplers for each bus line and for communicating N of said outputs to the second ports of the rightmost couplers for each bus line.

20. The optical bus of claim 19 wherein said plurality of laser sources are defined by the elements of a multi-element source array.

21. An optical device adapted to be interposed in an optical transmission medium, comprising:

an active coupler having first and second ports, an additional port, and a control element, said control element being responsive to input signals and operable to place said coupler in either of at least first and second states;

said first state preventing a significant fraction of light from said first port from reaching said second port;

said second state coupling a significant fraction of light from said first port to said second port and coupling a small fraction of light from said first port to said additional port; and a photodetector in optical communication with said additional port of said coupler.

22. The device of claim 21 wherein:

at least a portion of said coupler is constructed from an electro-optic material; and said control element includes at least one electrode configured to apply an electric field to at least a portion of said electro-optic material.

23. The device of claim 21 wherein:

said coupler is a directional coupler having an interaction region, at least a portion of which is constructed from an electro-optic material.

24. The device of claim 21 wherein:

said coupler is a Mach-Zehnder interferometer having first and second legs; and at least a portion of at least one of said legs is constructed from an electro-optic material.

25. The device of claim 21, and further comprising a transmitter unit having means for causing said control element to modulate light passing between said first and second ports according to a desired data pattern.

26. The device of claim 21, and further comprising:

a further additional port;

a second photodetector in optical communication with said further additional port; and means for causing said control element to place said coupler in said second state.

27. An optical bus for a computer system having a plurality of functional units, the bus having two ends designated the left end and the right end, comprising:

a plurality of active couplers, each having first and second ports, an additional port, and a control element, said control element being responsive to input signals and operable to place said coupler in either of at least first and second states;

said first state preventing a significant fraction of light from said first port from reaching said second port;

said second state coupling a significant fraction of light from said first port to said second port and coupling a small fraction of light from said first port to said additional port; and a photodetector in optical communication with said additional port of said coupler;

means for optically connecting said couplers in a serial fashion to define a bus line with one of said couplers being the leftmost coupler and another of said couplers being the rightmost coupler, wherein each coupler has its first port in optical communication with the second port of the coupler to the left, if any, and its second port in optical communication with the first port of the coupler to the right, if any;

means for injecting light into the first port of the leftmost coupler;

a plurality of transmitter units, each for applying control signals to a different respective one of said control elements, for selectively placing the respective coupler in a desired state; and a plurality of receiver units, each responsive to light at said additional port of a different respective one of said couplers, for providing signals representative of the light at said additional port when the respective coupler is in said second state.

28. The optical bus of claim 27 wherein:

at least a portion of at least one of said couplers is constructed from an electro-optic material; and said control element for said at least one of said couplers includes at least one electrode configured to apply an electric field to at least a portion of said electro-optic material.

29. The optical bus of claim 27 wherein:

at least one of said couplers is a directional coupler having an interaction region, at least a portion of which is constructed from an electro-optic material.

30. The optical bus of claim 27 wherein:

at least one of said couplers is a Mach-Zehnder interferometer having first and second legs; and at least a portion of at least one of said legs is constructed from an electro-optic material.

31. The optical bus of claim 27 wherein:

at least one of said receiver units includes means for causing said control element to place said coupler in said second state; and at least one of said transmitter units includes means for causing said control element to modulate light passing between said first and second ports according to a desired data pattern.

32. The optical bus of claim 27 wherein at least one of said receiver units comprises:

a photodetector in optical communication with said port; and means for causing said control element to place said coupler in said second state.

33. A method of establishing bus communication among a plurality of functional units, the bus having two ends designated the left end and the right end, comprising:

providing a plurality of active couplers, each having first and second ports, an additional port, and a control element, said control element being responsive to input signals and operable to place said coupler in either of at least first and second states;

said first state preventing a significant fraction of light from said first port from reaching said second port;

said second state coupling a significant fraction of light from said first port to said second port and coupling a small fraction of light from said first port to said additional port;

optically connecting said couplers in a serial fashion to define a bus line with one of said couplers being the leftmost coupler and another of said couplers being the rightmost coupler, wherein each coupler has its first port in optical communication with the second port of the coupler to the left, if any, and its second port in optical communication with the first port of the coupler to the right, if any;

injecting light into the first port of the leftmost coupler;

selectively applying control signals to said control elements, for selectively placing the respective couplers in a desired state; and detecting light at said additional ports of said couplers, thereby providing signals representative of the light at said additional ports when the respective couplers are in said second state.

* * * * *